United States Patent [19]

Denisov et al.

[11] Patent Number: 4,546,256
[45] Date of Patent: Oct. 8, 1985

[54] SPECTROPHOTOMETER FOR MEASURING TRANSMISSION SPECTRA

[75] Inventors: Roman A. Denisov; Valdur M. Tiit; Eduard K. Feldbakh, all of Tartu, U.S.S.R.

[73] Assignee: Institut Fiziki Akademii Nauk Estonskoi SSR, Tartu, U.S.S.R.

[21] Appl. No.: 421,804

[22] Filed: Sep. 23, 1982

[30] Foreign Application Priority Data

Mar. 4, 1982 [SU] U.S.S.R. ............... 3404546

[51] Int. Cl.⁴ .............................................. G01J 3/42
[52] U.S. Cl. .......................... 250/372; 356/324; 356/333; 356/51
[58] Field of Search ............. 356/326, 328, 333, 334, 356/51, 323, 324; 250/339, 373, 372

[56] References Cited

U.S. PATENT DOCUMENTS

| 2,984,146 | 5/1961 | Kwart et al. | 356/323 X |
| 3,155,762 | 11/1964 | Gillham et al. | 356/333 X |
| 3,247,758 | 4/1966 | Turner | 356/333 X |
| 3,512,889 | 5/1970 | Liston | 356/324 |
| 3,565,567 | 2/1971 | Rains | 356/333 |
| 3,730,626 | 5/1973 | Cruvellier et al. | 356/334 X |
| 4,342,516 | 8/1982 | Chamran et al. | 356/334 X |

OTHER PUBLICATIONS

Vishnevskii et al., *Zhurnal Prikladnoi Spektroskopii,* vol. 16, No. 4, Mar. 15, 1971, pp. 746-749.
Gerasimova et al., *Instrum & Exp. Tech.* (USA), vol. 20, No. 1, Jan.-Feb. 1977, pp. 320-325.

*Primary Examiner*—F. L. Evans
*Attorney, Agent, or Firm*—McAulay, Fields, Fisher, Goldstein & Nissen

[57] ABSTRACT

In a spectrophotometer for measuring transmission spectra, the holder with a test sample is disposed inside the double monochromator between the intermediate slit and the second dispersive element and is capable of moving across the propagation path of the light flux at the output of the intermediate slit for placing the test sample in the path of the light flux and removing the sample from the path of the light flux.

12 Claims, 2 Drawing Figures

SPECTROPHOTOMETER FOR MEASURING TRANSMISSION SPECTRA

FIELD OF THE INVENTION

The present invention relates to applied physics, and particularly to spectrophotometers for measuring transmission spectra. The invention can be extensively used in physical, chemical, and biological investigations, as transmission of samples in visible, ultraviolet, and vacuum ultraviolet spectral regions is determined by spectrophotometry. The invention can be most successfully used when measuring transmission spectra of strong-absorbing and luminescent materials.

BACKGROUND OF THE INVENTION

One known spectrophotometer for measuring transmission spectra (cf. for example, Spectrophotometer Specord UV VIS described in Catalogue No. 32-3356-8, VEB Carl Zeiss Jena, pp. 4–6) comprises a light source, a single monochromator, a light detector connected to a recording means, and a holder with test sample placed between the monochromator and the light detector. This spectrophotometer allows measurement of sample transmission within the range of 100% to 3% of the incident light intensity, and for a range of wavelengths between 900 and 180 nm. Such a limited transmission measuring range is caused by a high diffuse light background in the monochromator.

Known in the art is a spectrophotometer for measuring transmission spectra (cf. for example, the sectrophotometer Acta M UV/VIS-NIR described in "Bulletin CR-7255", Beckman, Switzerland, 1975) differing from the device mentioned above in that a double monochromator is employed here rather than a single monochromator, for the purpose of diffuse light background suppression, the sequential arrangement of the component parts of the spectrophotometer remaining unaltered. This spectrophotometer allows transmission to be measured within the range of 100% to 0.1%, for the wavelengths between 900 and 180 nm. This transmission measuring range, however, is not satisfactory enough for present-day investigations.

Also known in the art is a spectrophotometer for measuring transmission spectra (cf. for example, a spectrophotometer described in the catalogue "Computerized UV/VIS and UV/VIS/NIR Absorption spectrophotometers" 320/330, Catalog N EX-E543 P, Hitachi Ltd, Tokyo, Japan) comprising a light source, a double monochromator, a light detector, and a recording means. Interposed between the output of the double monochromator and the light detector is a holder with a test sample secured thereto. The monochromator comprises a first slit, a first dispersive element, a second slit, a collimator mirror, and a second dispersive element all arranged in series along the propagation path of the light flux. The first slit disposed at the input of the double monochromator represents its input slit, and the second slit first guiding the light flux from the first dispersive element to the second dispersive element and then passing it out of the monochromator, serves a double purpose, namely it acts both as an intermediate slit of the monochromator and as its output slit, the direction of the light flux through the second slit being changed by the collimator mirror.

The use of high-precision components in this spectrophotometer allows extension of the transmission measuring range down to 0.1% compared to the aforementioned device, for the same wavelength range. For test samples having transmission values in excess of 0.01%, however, a sharp decrease in the measuring accuracy occurs. This is due to the fact that the luminescence background induced by the sample, as the incident light is partially absorbed, becomes comparable to intensity of the light that passed through the sample, and since the sample is positioned after the output slit of the monochromator and immediately before the light detector, this luminescence will be sensed by the light detector along with the light passed through the sample, causing the value of the signal detected by the recording means to be much in excess of that corresponding to the intensity of light passed through the sample. So luminescence of the sample presents difficulties in measuring small light fluxes passed through the sample, thus restricting the transmission measuring range to 0.01% and preventing measurement, with sufficient accuracy, of transmission spectra of samples made of luminescent and strong-absorbing materials, which limits the range of samples investigated.

SUMMARY OF THE INVENTION

It is an object of the present invention to provide a spectrophotometer for measuring transmission spectra, such that ensures a better accuracy of measurement.

Another object of the invention is to provide a spectrophotometer for measuring transmission spectra, such that ensures an extended range of transmission measurement.

A further object of the invention is to provide a spectrophotometer for measuring transmission spectra such that minimizes the effect of luminescence of the test sample on the measurement results.

It is still another object of the invention to provide a spectrophotometer allowing measurement of transmission spectra of samples of luminescent and strong-absorbing materials.

With these and other objects in view there is proposed a spectrophotometer for measuring transmission spectra comprising a light source, a double monochromator including an input slit, a first dispersive element, an intermediate slit, a second dispersive element, and an output slit all arranged in series along the propagation path of the light flux, a holder for the test sample, a light detector, and a recording means connected to the output of the light detector, wherein, according to the invention, the test sample holder is disposed inside the monochromator between the intermediate slit and the second dispersive element and is capable of being moved transversely to the path of the light flux at the output of the intermediate slit, for placing the test sample across the propagation path of the light flux and for removing the sample from the propagation path of the light flux.

With the holder and test sample so positioned, luminescence induced by the sample is deflected by the second dispersive element of the monochromator from its output slit and is caused to miss the light detector. This provides a better measuring accuracy and enables weak light fluxes passed through the sample to be measured.

These and other objects and advantages of the present invention will be more apparent from a detailed description of its preferred embodiment taken in conjunction with the accompanying drawings.

DESCRIPTION OF THE PREFERRED EMBODIMENT OF THE INVENTION

Figure 1:
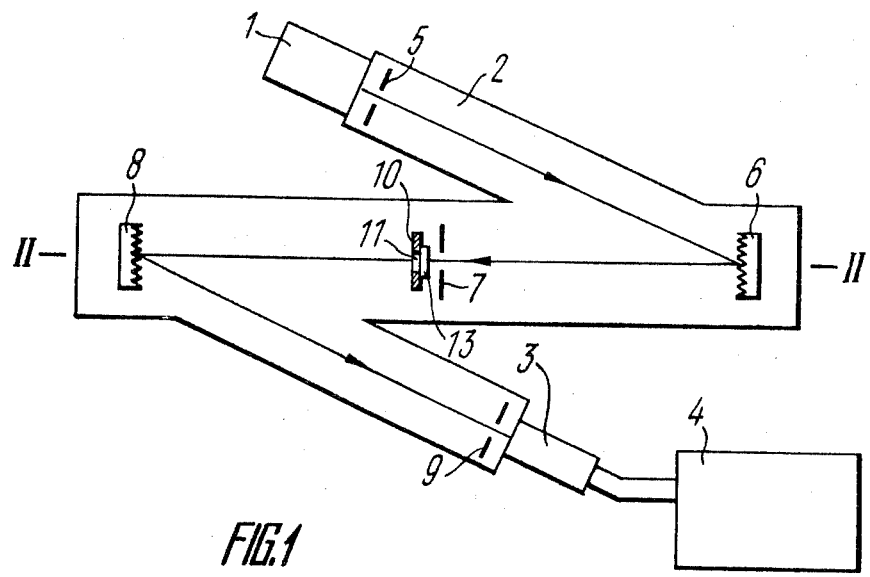
FIG. 1 is a schematic representation of a spectrophotometer for measuring transmission spectra, according to the invention.

The spectrophotometer for measuring transmission spectra according to the invention comprises a light source 1 (FIG. 1), a double vacuum monochromator 2, a light detector 3, and a recording means 4. The light source 1 may be in the form of a hydrogen or deuterium lamp providing a wide spectral region of radiation. The double monochromator 2 may be based, for example, on the Johnson-Onaka circuit and comprises an input slit 5, a first dispersive element 6, an intermediate slit 7, a second dispersive element 8 and an output slit 9, all arranged in series along the propagation path of the light flux. The dispersive elements 6 and 8 may represent concave gratings, the distance from the slits 5 and 7 to the dispersive elements 6 and 8, respectively, being defined by the radius of curvature of the gratings.

Figure 2:
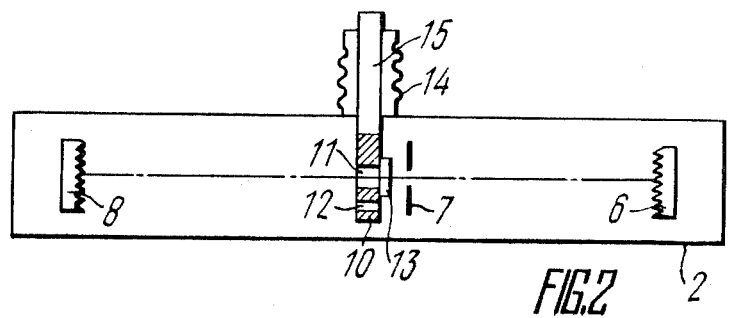
FIG. 2 is a section on the line II—II of FIG. I.

The rotation of the dispersive elements 6 and 8 for scanning the optical spectrum is provided by a stepper motor drive and mechanical transmission or a synchro system not shown in FIGS. 1 and 2 for the sake of simplicity.

Interposed between the intermediate slit 7 and the second dispersive element 8 of the monochromator 2 is a holder 10 with a pair of windows 11 and 12 (FIG. 2). One of the windows, say, the window 11 has mounted thereon a test sample 13 covering this window 11. The holder 10 disposed in the monochromator 2 is capable of being moved across the propagation path of the light flux after it has passed through the intermediate slit 7, so that either the test sample 13 or the window 12 (without the sample) is placed across the propagation path of the light flux. This movement is provided by a bellows system 14 with one of its ends hermetically sealed to the monochromator 2 and the other connected, through a rod 15, to the holder 10. The rod 15 with the holder 10 may be moved and locked in two positions using any known suitable means which are not shown in FIG. 2 for the sake of simplicity.

The holder 10 with the sample 13 may be placed at any point in the path of the light flux between the intermediate slit 7 and the second dispersive element 8, but the positioning of the holder 10 nearer the intermediate slit 7 is to be preferred, considering investigation of small-size samples. The holder 10 may be formed by a helium, nitrogen, etc. cryostat, if the necessity arises to determine that transmission of a sample within a range of temperatures.

The light detector 3 (FIG. 1) such as the photoelectric multiplier is disposed at the output of the monochromator 2. The output of the light detector 3 is connected to the input of the recording means 4 which may take the form of a numeral-printing device, a recorder, or a computer.

The operation of the proposed spectrophotometer now follows.

The holder 10 is placed in the first measuring position with the window 12 (FIG. 2) without the sample 13 interposed in the propagation path of the light flux. The light flux from the light source 1 (FIG. 1) is directed through the input slit 5 of the monochromator 2 to the first dispersive element 6 that brings about its dispersion into a spectrum in the plane of the intermediate slit 7. A monochromatic light flux is separated from the spectrum by the intermediate slit 7, according to its width, which flux is then passed to the second dispersive element 8 that performs an additional monochromatization of the light flux from the intermediate slit 7. The light flux monochromatized by the second dispersive element 8 passes to the output slit 9 and then to the light detector 3 generating an electric signal of a value dependent on the light flux intensity in this particular spectral region. This signal is recorded by the recording means 4. It will be noted that the double monochromator is suited both for dispersion addition and for dispersion subtraction mode of operation.

The holder 10 is then placed in the second measuring position, where the window 11 with the sample 13 secured thereto comes to be interposed in the propagation path of the light flux. In this case, the light flux from the intermediate slit 7 is partially absorbed by the sample 13 and partially passes therethrough to the second dispersive element 8, and then through the output slit 9 to the light detector 3, as described hereinabove.

If luminescent radiation is induced in the sample 13 struck by the light, this radiation being spectrally different from the initial light because of the Stokes shift, will be deflected by the second dispersive element 8 away from the output slit 9, will be absorbed by the walls of the monochromator 2 and therefore will not strike the light detector 3.

The dispersive elements 6 and 8 are then rotated, extracting the next spectral region of radiation from the source 1 and again measuring the light intensity at the output of the monochromator 2 with the holder 10 in two positions (i.e. alternately, with the sample 13 and the empty window 12 placed across the propagation path of the light flux). So, scanning the radiation spectrum of the source 1, the corresponding electric signals are recorded by the recording means 4, and by comparing them at every spectral point, the transmission (or absorption) spectrum of the sample 13 is obtained.

Owing to a reduced amount of spurious luminescent radiation from the sample striking the light detector, the proposed spectrophotometer provides an improved accuracy of measurement and an extended transmission measuring range to $10^{-7}\%$, i.e. five orders of magnitude better than in the known spectrophotometer. The vacuum monochromator used in the proposed spectrophotometer allows the spectra measured to be shifted into the region of 300 nm–100 nm, which is of importance for current investigations.

It is obvious, that other embodiments of the proposed spectrophotometer will be equally efficient, viz. any double monochromator can be employed, both of the vacuum and of the non-vacuum type, according to the spectral region under investigation; also, the dispersive elements may represent plane gratings or prisms, and the light source may be any source that provides radiation in the spectral region investigated.

What is claimed is:

1. A spectrophotometer for measuring spectra in a spectral range of wavelengths from 100 to 300 nm and an extended transmission measuring range to $10^{-7}\%$ of the incident light intensity, comprising:
   a light source for generation of a light flux;
   a double monochromator consisting essentially of an input slit, a first dispersive element, an intermediate slit, a second dispersive element, and an output slit, all arranged in series along the propagation path of said light flux;

a holder for a test sample disposed in said monochromator between said intermediate slit and said second dispersive element and capable of moving across the propagation path of said light flux that passed through said intermediate slit;

means for providing said movement of said holder between a first position for placing said sample across the propagation path of said light flux and a second position for removing said sample from the path of said light flux so that the test sample is only across said propagation path in said first position;

a light detector positioned in the path of said light flux after said monochromator and having an output; and a recording means having an input connected to said output of said light detector.

2. The spectrophotometer as defined in claim 1, wherein said monochromator is a double vacuum monochromator.

3. The spectrophotometer as defined in claim 1, wherein said light source is a hydrogen or deuterium lamp providing a wide spectral region of radiation.

4. The spectrophotometer as defined in claim 1, wherein said holder is a cryostat.

5. The spectrophotometer as defined in claim 1, wherein each of said dispersive elements consists of a single concave grating.

6. The spectrophotometer as defined in claim 5, wherein the distance from said slits to said gratings is substantially defined by the radius of curvature of said gratings.

7. The spectrophotometer as defined in claim 1, wherein said dispersive elements consist solely of two concave gratings to provide only two optical surfaces and thereby minimizing diffuse light.

8. The spectrophotometer as defined in claim 1, wherein said holder has a pair of windows, one window for said first position and another window for said second position, and said test sample is mounted on said window for said first position so that said sample in said first position and the other window in said second position can be placed across the propagation path of said light flux.

9. The spectrophotometer as defined in claim 1, wherein said means providing said movement of said holder from said first position to said second position consists of a bellows system to provide translatory movement solely between said first and said second positions, said system having one end sealed to said monochromator and another end connected to said holder.

10. The spectrophotometer as defined in claim 1, wherein said holder is positioned nearer said intermediate slit, thereby eliminating luminescence at low intensity of diffuse light.

11. A spectrophotometer for measuring spectra in a visible and vacuum ultraviolet spectral range and having an extended measuring range, comprising:

a light source for generation of a light flux;

a double monochromator consisting essentially of an input slit, a first dispersive element, an intermediate slit, a second dispersive element, and an output slit, all arranged in series along the propagation path of said light flux;

a test sample on a holder disposed in said monochromator between said intermediate slit and said second dispersive element and capable of moving across the propagation path of said light flux that passed through said intermediate slit;

means for providing said movement of said holder between a first position for placing said sample across the propagation path of said light flux and a second position for removing said sample from the path of said light flux so that the test sample is only across said propagation path in said first position;

a light detector positioned in the path of said light flux after said monochromator and having an output; and a recording means having an input connected to said output of said light detector.

12. The spectrophotometer as defined in claim 11, wherein said sample is positioned nearer said intermediate slit, thereby eliminating luminescence at low intensity of diffuse light.

* * * * *

UNITED STATES PATENT AND TRADEMARK OFFICE
CERTIFICATE OF CORRECTION

PATENT NO. : 4,546,256

DATED : October 8, 1985

INVENTOR(S) : Roman A. DENISOV, et al.

It is certified that error appears in the above—identified patent and that said Letters Patent is hereby corrected as shown below:

Column 1, line 49, change "Ltd," to --Ltd.,-- .

Column 1, line 68, change "0.1%" to --0.01%--.

Column 2, line 2, change "0.01%" to --0.1%--.

Signed and Sealed this

Sixth Day of May 1986

[SEAL]

Attest:

DONALD J. QUIGG

Attesting Officer

Commissioner of Patents and Trademarks